United States Patent [19]

Chambers et al.

[11] 4,092,566
[45] May 30, 1978

[54] SWITCHED HIGH VOLTAGE POWER SUPPLY SYSTEM

[75] Inventors: Derek Chambers, Bedford, N.H.; Hugh C. Masterman, Littleton, Mass.

[73] Assignee: Raytheon Company, Lexington, Mass.

[21] Appl. No.: 758,974

[22] Filed: Jan. 13, 1977

Related U.S. Application Data

[63] Continuation of Ser. No. 573,710, May 1, 1975, abandoned.

[51] Int. Cl.² ............................................. H01J 29/80
[52] U.S. Cl. ...................................... 315/375; 358/73
[58] Field of Search ..................... 315/375; 358/72, 73

[56] References Cited

U.S. PATENT DOCUMENTS

| 3,413,409 | 11/1968 | Giles | 358/73 |
| 3,492,416 | 1/1970 | Weber | 358/72 |
| 3,619,647 | 11/1971 | Barkow | 358/73 |

Primary Examiner—Maynard R. Wilbur
Assistant Examiner—T. M. Blum
Attorney, Agent, or Firm—J. R. Inge; M. D. Bartlett; J. D. Pannone

[57] ABSTRACT

A high voltage power supply system particularly adapted for rapid switching of high voltage applied to an anode of a beam penetration color cathode-ray tube. Energy for making the rapid transition between voltage levels is stored in two energy storage inductors, one for upward transitions and the other for downward transitions. When it is desired to change the voltage applied to the cathode-ray tube, the appropriate one of the storage inductors is coupled through a controlled switch to the anode causing the voltage applied to the anode to change at a rapid rate. The voltage rises until the desired voltage level corresponding to a desired output color is reached at which time the switch is turned off and the storage inductor recharged. A tracking high voltage supply maintains the anode at the predetermined voltage level once that level has been reached. Gain compensation is applied to the deflection amplifiers within the system so that patterns displayed upon the cathode-ray tube have a constant size independent of the voltage applied to the final anode of the tube.

27 Claims, 8 Drawing Figures

SWITCHED HIGH VOLTAGE POWER SUPPLY SYSTEM

CROSS-REFERENCE TO RELATED CASES

This is a continuation of application Ser. No. 573,710, filed May 1, 1975, now abandoned.

BACKGROUND OF THE INVENTION

1. Field of the Invention

The invention relates generally to high voltage switching power supplies and in particular to those high voltage switching power supplies for use with beam penetration type color cathode-ray tubes. Such cathode-ray tubes generally have two or more layers of phosphors forming a phosphorescent screen, the color emitted from the screen being dependent upon the voltage aplied to the screen electrode. Once such cathode-ray tube and system employing the same is shown in U.S. Pat. No. 3,840,773 issued Oct. 8, 1974 to Harold M. Hart and assigned to the present assignee.

One of the most significant problems encountered with use of such tubes is the rate at which the voltage applied to the screen anode can be changed. The screen anode forms a relatively large capacitance with the surrounding grounded structure making it necessary to charge and discharge the capacitor as the voltage applied to the screen anode is changed. Use of beam penetration type cathode-ray tubes has heretobefore been restricted due to the large power requirements and attendant high cost of prior high voltage switching power supplies.

2. Description of the Prior Art

The earliest approach for providing a variable high voltage source for beam penetration cathode-ray tube was the use of a standard variable voltage high voltage power supply which tracked an input voltage indicative of the voltage applied to the final accelerating anode of the beam penetration cathode-ray tube. Switching times between colors were excessively long using this type of power supply. Often, switching times were so slow that it was not possible to switch between colors more than one time during each display refresh cycle. All data and patterns to be displayed in one particular color had to be written upon the screen of the cathode-ray tube before the color changed and be other data and patterns of other colors could be displayed. Such systems could not readily be used for the display of, for example, radar data where signals are continuously received from a radar processor during a refresh cycle and the color of individual sections of data to be displayed is not a priori known.

Later, systems were developed having a low impedance power supply selectively coupled to two accelerating electrodes of the beam penetration cathode-ray tube through silicon controlled rectifier switches. One such system is described in U.S. Pat. No. 3,492,416 issued Jan. 20, 1970 to R. L. Weber. These systems suffered from a number of disadvantages. Firstly, the voltage applied to two separate accelerating electrodes had to be varied in a predetermined nonlinear manner. Switching between colors was not achieved particularly rapidly as energy was transferred to the accelerating electrodes only as a sequence of pulses from a resonant circuit formed with a coupling transformer. Moreover, as the silicon controlled rectifiers used therein had to be turned off by current reversal achieved through a resonant circuit, the amount of energy transferred to the anodes was limited to discreet amounts determined by the energy content of the various pulses. Hence, it was somewhat difficult to control the precise voltage applied to the anodes. Moreover, there was no provision made in these systems for automatically compensating the gain of the deflection amplifiers for changes in the deflection factor the tube caused by varying the voltages applied to the accelerating electrodes.

Later, systems were developed in which energy stored in inductors was transferred to the accelerating electrode of a beam penetration cathode-ray tube. Such a system is described in U.S. Pat. No. 3,780,339 issued Dec. 18, 1973 to Alfred J. Mayle. That system required precisely controlled equal and opposite voltage sources applied to the accelerating anode and to the cathode of the cathode-ray tube shown therein. Changing colors was achieved by changing the polarity of the voltage applied to the accelerating electrode relative to ground potential. The cathode of the tube had to be operated at a high voltage making it necessary that the video signals and other operating voltages applied to the tube be biased with the same high voltage. Such operation necessarily complicated the construction of such circuits and made them more expensive than they would otherwise be except for the presence of the high biasing voltage. Also, such a system is only capable of operating between two different voltages and hence can only reproduce two different colors.

SUMMARY OF THE INVENTION

Accordingly, it is an object of the present invention to provide a multi-color cathode-ray tube display system in which transitions between colors of light emitted from the cathode-ray tube are achieved in a short period of time.

It is also an object of the invention to provide a power supply capable of rapidly varying the voltage applied across a primarily capacitive load.

These as well as other objects of the invention are met by providing the combination of a beam penetration cathode-ray tube having accelerating and screen electrodes and means for coupling energy from inductive storage means to the screen electrode in response to a signal determinative of the color of light to be emitted by the cathode-ray tube. The amount of energy coupled from the inductive storage means is determined by a predetermined change or levels of the voltage applied to the screen electrode. Coupling is accomplished by switching means operating in response to the voltage applied to the screen electrode and to the signal determinative of the color of light to be emitted by the cathode-ray tube. Energy transfer from the inductive storage means is initiated by this signal and ceased when the voltage applied to the screen electrode reaches a predetermined value. In the preferred embodiment, the voltage applied to the accelerating electrode is substantially constant. Means may further be provided for maintaining the predetermined value of voltage upon the screen electrode once that value has been reached.

The objects of the invention may also be met by providing a beam penetration cathode-ray tube having accelerating and screen electrodes, at least one inductor, means for maintaining an idling current through said inductor when transitions in voltage applied to the screen electrode are not being made, and means for selectively coupling the inductor to the screen electrode in response to a signal for controlling the color of light emitted by the cathode-ray tube. The coupling means comprises switching means which operates to couple the inductor to the screen electrode upon a change in the signal and operating to uncouple the inductor from the screen electrode when the voltage applied to the screen electrode is at a value causing the color of light indicated by the signal to be emitted by the cathode-ray tube. The coupling means may further comprise transformer means. In the preferred embodiment, the inductor, idling current maintaining means, and coupling means are each two in number; one of each being provided for upwards transitions of the voltage applied to the screen electrode and one of each being provided for downwards transitions of that voltage. The combination may further include means for deflecting the beam of the cathode-ray tube and means coupled to the deflecting means and operating in response to the voltage applied to the screen electrode for compensating the magnitude of signals produced by the deflecting means such that the size of patterns displayed on the cathode-ray tube is substantially independent of the color in which the patterns are displayed.

The invention may also be met by a power supply comprising the combination of inductive storage means, means for maintaining a current through the inductive storage means, and switch means for coupling the inductive storage means to a load for changing the voltage at the load to a predetermined value and for uncoupling the inductive means from the load when the predetermined value has been attained. Means may be provided for sensing the voltage at the load, the switch means uncoupling the inductive means from the load in response to the voltage cinch thereby. Transformer means may couple the output of the switch means to the load. A voltage supply means may be coupled to the transformer means. Preferably, means is provided for maintaining the predetermined voltage at the loads once the predetermined voltage has been attained.

Moreover, the invention can be practiced with the combination of an up-voltage step circuit and a down-voltage step circuit wherein each of the circuits comprises an inductor, means for maintaining an idling current through the inductor, switching means coupled to the inductor, first and second DC power supply means coupled in series with one another, first and second transformer means wherein the first transformer means is coupled to an output of the up-voltage step circuit and the second transformer means is coupled to an output of the down-voltage step circuit and wherein each of the transformer means is coupled to load means, means for operating the switch means in the up-voltage step circuit to couple the inductor therein to the first transformer means in response to a signal indicating an upward transition in voltage and means for operating the switch means in the down-voltage step circuit to couple the inductor therein to the second transformer means in response to a signal indicating a downward transition in voltage, and means for operating both of said switch means to uncouple the inductor means from the transformer means when a predetermined voltage value has been reached in response to the voltage across the load. Means may further be provided for maintaining the predetermined voltage across the load when the predetermined voltage has been reached. Means is provided for producing the signal indicating an upward transition in voltage and the signal indicating a downward transition in voltage. The signal producing means preferably comprises means for receiving a digital word indicative of the voltage to be produced across the load, means for comparing the digital word with a previously received digital word, and means for producing one of the signals when said digital word is larger than the previously received digital word and for producing the other one of the signals when the digital word is smaller than the previously received digital word, means for producing an analog voltage in response to the digital word, and means for comparing the analog voltage with the voltage proportional to the voltage across the load, and means for ceasing production of the signals in response to the comparing means. The load may be an electrode of a beam penetration cathode-ray tube. The beam penetration cathode-ray tube is preferably a split-electrode cathode-ray tube wherein the electrode comprises the screen anode of that tube. Means may be provided for deflecting the beam of the cathode-ray tube such as X-axis and Y-axis deflection amplifiers and X-axis and Y-axis deflection coils. Means may be provided for varying the magnitude of output signals from the deflection amplifiers in response to the voltage applied to the screen anode. The magnitude varying means may comprise means for producing a scaling signal in proportion to the voltage applied to the screen anode added to a constant voltage, means for multiplying output signals produced by the deflection amplifiers by the scaling signal to produce a compensating signal, and means for summing the output signals produced by the deflection amplifiers with the compensating signal. The cathode-ray tube may further comprise an accelerating electrode with a substantially constant voltage coupled thereto. Means may also be provided for producing digital signals indicative of beam deflections of the cathode-ray tube and means for converting the digital signals to analog signals.

The invention may also be practiced by the method comprising the steps of storing energy in inductive storage means, coupling energy from the inductive storage means to a load in response to a signal for changing the voltage across the load, and ceasing the coupling of energy from the inductive storage means to the load when the voltage across the load has reached a predetermined value. The load preferably comprises an anode of a beam penetration cathode-ray tube in which the changing of the voltage changes the color of light emitted from the tube. The method may further comprise the step of maintaining the voltage at the predetermined level once that predetermined level has been reached. The beam of the cathode-ray tube may be deflected in response to signals representing patterns to be displayed upon the screen of the tube. The magnitude of the output signals from the beam deflecting means are varied in response to the voltage applied to the anode.

DESCRIPTION OF THE PREFERRED EMBODIMENT

Figure 1:
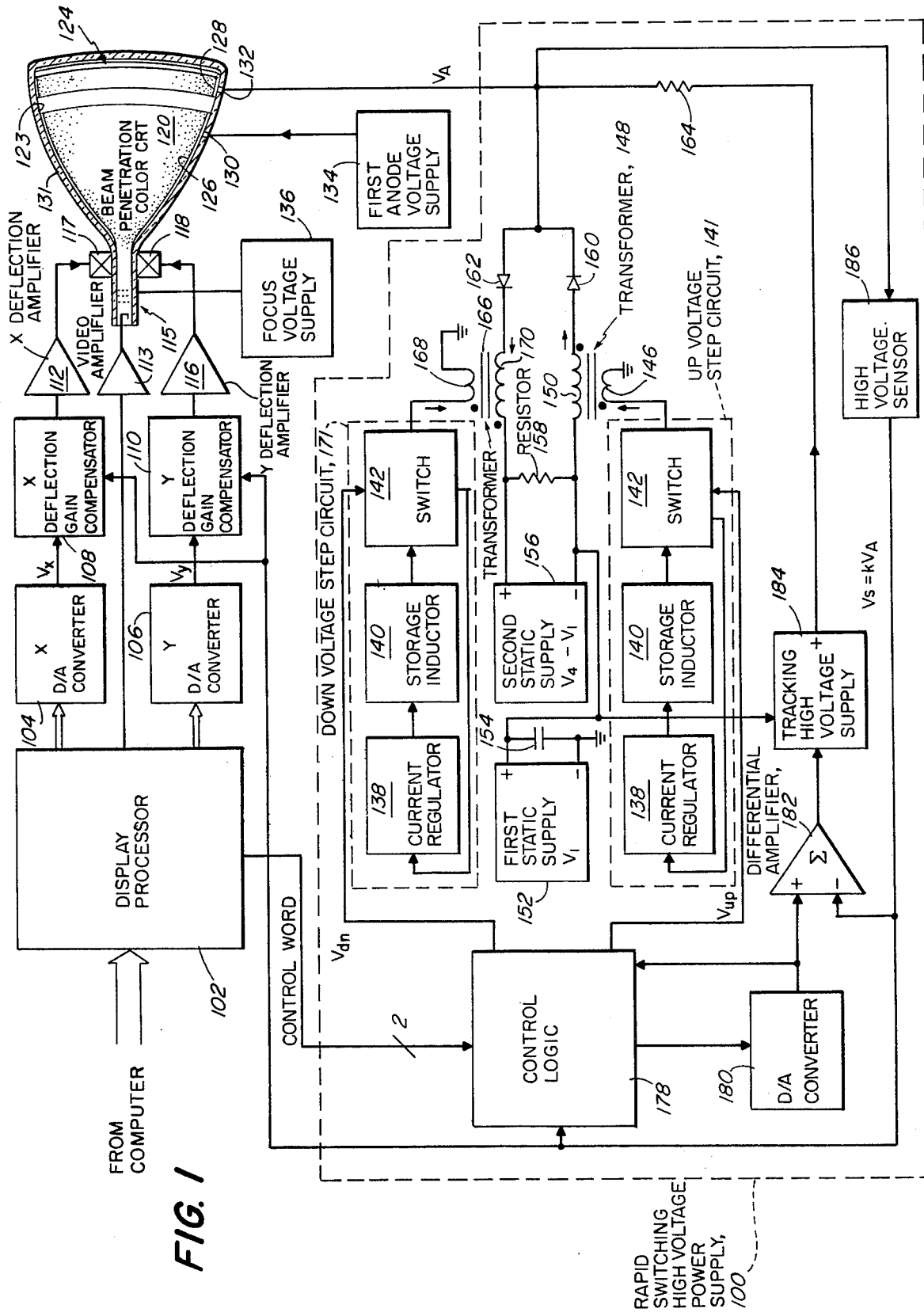
FIG. 1 is a block diagram of a display system employing the present invention.

Referring first to FIG. 1 there is shown therein a block diagram of a display system using a beam penetration color cathode-ray tube 120 in which the invention is used to advantage. Beam penetration color cathode-ray tube 120 is of the type shown and described in the above-referenced U.S. Pat. No. 3,840,773 issued Oct. 8, 1974 to Harold M. Hart, the specification of which is incorporated herein by reference. Beam penetration color cathode-ray tube 120 has a phosphor screen 124 comprising two or more different phosphor types each emitting a different color of light upon excitation thereof by a beam of electrons. The phosphor types may be arranged in layers one above the other as shown in FIG. 1 or may be arranged in a single layer having particles of one phosphor type coating an inner particle or particles of other phosphor types. In still another embodiment, screen layer 124 is made up of two or more phosphor types the individual particles of at least one of the phosphor types being precoated with a non-light emitting substantially transparent dielectric layer. In any case, the light emitted from the face of cathode-ray tube 120 is dependent upon the velocity at which electrons emitted by electron gun 115 strike phosphor screen 124.

In the preferred embodiment, beam penetration color cathode-ray tube 120 has two anodes within bell-shaped glass envelope 131. Screen electrode 128 is electrically coupled to phosphor screen 124 through a thin aluminization layer on the back of phosphor screen 124. Screen electrode 128 extends slightly into the bell-shaped glass envelope as a conductive coating thereon. A non-conductive gap 123 separates screen electrode 128 from accelerating electrode 126. Accelerating electrode 126 extends from the rear of gap 123 into the neck portion 115 of cathode-ray tube 120. Contact 130 extends through glass envelope 131 to accelerating electrode 126 and contact 132 extends through the glass to screen electrode 128.

This split anode type of construction for beam penetration cathode-ray tube 120 is preferred for its reduced capacitance between screen electrode 128 and surrounding grounded structures. However, the invention may also be used to advantage with nonsplit anode type beam penetration cathode-ray tubes. It may also be used to advantage in other situations requiring rapid switching of a voltage across a primarily capacitive load.

Rapid switching high voltage power supply 100 provides the variable high-voltage applied to screen electrode 128. In the preferred embodiment of the invention shown in FIG. 1 four separate voltage levels are employed corresponding to four separate colors emitted from beam penetration color cathode-ray tube 120. These voltages are designated herein as $V_1$ to $V_4$ in ascending order. Display processor 102 which receives its digital inputs preferably from a computer, provides a two-bit digital control word to control logic 178 to determine the color and voltage to be produced at any one time. One of the four possible control states of the two-bit control word corresponds to each of the voltages $V_1$ to $V_4$. Of course, any number of different voltage states and corresponding color outputs can be used with the invention, the number four being chosen by way of illustration only.

Control logic 178 monitors continuously the state of the two-bit control word coupled to it by display processor 102. Whenever a change in the state of the control word is sensed, control logic 178 determines first whether the voltage transition to be made is upwards or downwards and secondly what the magnitude of the transition should be and hence what the corresponding final voltage level should be. When the final voltage is higher than the present voltage, the signal $V_{up}$ is activated until the higher voltage is reached. Correspondingly, when the transition in voltage is from a higher voltage to a lower voltage, the signal $V_{dn}$ is activated until the lower voltage is reached.

Up voltage step circuit 141 and down voltage step circuit 171 provide the bulk of the energy required in making the rapid transition between voltage levels as is characteristic of the invention. During times when no transitions are being made between voltage levels, current regulator 138 provides an idling current through storage inductor 140. The amount of energy thusly stored in storage inductor 140 is sufficient to make rapid transitions between the highest and lowest voltage levels. When a change is to be made in the voltage applied to screen electrode 128, $V_{up}$ or $V_{dn}$ activates the corresponding one of switches 142. For an upward transition in voltage, the energy stored in storage inductor 140 of up voltage step circuit 141 is coupled through transformer 148 and diode 160 to contact 132 and hence screen electrode 128. During times of positive transitions, the dotted end of primary winding 146 increases in voltage at the same time that the dotted end of secondary winding 150 is similarly positively increasing. The undotted or negative end of primary winding 146 is grounded. The negative end of secondary winding 150 is connected to the positive terminal of first static supply 152. First static supply 152 produces a voltage $V_1$ corresponding to the lowest of the voltages which may be applied to screen electrode 128. Capacitor 154, which is large in magnitude compared to the capacitance of screen electrode 128 with respect to ground and which is coupled across the output terminals of first static supply 152, lowers the effective impedance of first static supply 152 so that its voltage remains substantially constant during voltage transition times.

During the time when an upward transition in the voltage applied to screen anode 128 is being made, current flows through primary winding 146 and secondary windings 150 in the directions indicated by arrows. Accordingly, a positive voltage is developed across secondary winding 150 which is in series with the voltage $V_1$ produced by first static supply 152. When the sum of the voltage developed across secondary winding 150 and $V_1$ exceeds the present voltage of screen anode 128, diode 160 begins to conduct and current flows towards screen anode 128. Current continues to flow until the desired voltage level has been reached.

When the desired voltage level has been reached, $V_{up}$ is deactivated causing switch 142 of up voltage step circuit 141 to be turned off. The voltage induced across secondary winding 150 then returns to zero. As the voltage $V_1$ is never greater than the lowest possible voltage applied to screen anode 128, no further current can then flow through diode 160.

The operation of down voltage step circuit 171 is substantially similar to that of up voltage step circuit 141. However for the case of down voltage step circuit 171, the positive going terminal of transformer 166 is coupled to the positive terminal of second static supply 156. Second static supply 156 produces a voltage equal to $V_4 - V_1$, the difference between the highest and lowest possible voltages applied to screen electrode 128. Second static supply 156 is in turn connected in series with the output of first static supply 152. During times when no voltage transitions are being made, the voltage across secondary winding 170 is substantially zero. The sum of the output voltages from first static supply 152 and second static supply 156, $V_4$, reverse bias diode 162 so that no current can flow from screen electrode 128. When a downward transition in voltage is to be made, current flowing in primary winding 168 in the direction indicated by the arrow induces a voltage across secondary winding 170. This voltage subtracts from the voltage produced by the series combination of the first static supply 152 and second static supply 156. When the total voltage at the undotted end of secondary winding 170 falls below the current voltage level of screen anode 128, current begins to flow through diode 162. Current continues to flow until the lower voltage value is reached. At this time $V_{dn}$ is deactivated turning switch 142 off and ceasing current flow through primary winding 168 and returning the voltage across secondary winding 170 to zero.

During times when no downward-voltage transitions are being made, current from second static supply 156 continuously flows through resistor 158. During a downward transition, current which flows through secondary winding 170 of transformer 166 also flows through resistor 158 to first static supply 152. As the voltage across resistor 158 is maintained at a constant value by second static supply 156 the current which flows through resistor 158 will remain constant whether or not a downward-voltage transition is taking place. During a downward-voltage transition the current flowing from second static supply 156 is diminished by the amount of current flowing through secondary winding 170. It should be noted here that it is necessary that a resistor be placed across the output terminals of second static supply 156 as current cannot ordinarily be made to flow backwards through such a conventional power supply. Moreover, a capacitor may not be coupled across the output terminals of second static supply 156 as it would charge up in voltage because of the current flowing from secondary winding 170. This would tend to increase the voltage applied to the dotted end of secondary winding 170 which in turn would tend to reverse bias diode 162 causing current flow to cease.

Tracking high voltage supply 184 maintains the desired voltage upon screen anode 128 after transitions in voltage have been completed. Only a small amount of current needs to be supplied to screen anode 128 during steady-state conditions when voltage transitions are not being made as screen anode 128 is primarily a capacitive load with a very high resistance between it and ground. Typically, only several microamps of current need be supplied from tracking high voltage supply 184 to maintain the desired voltage level.

The output voltage on the positive terminal of tracking high voltage power supply 184 is produced in response to an input voltage produced by digital/analog converter 180, differential amplifier 182, and high voltage sensor 186. The two-bit control word from display processor 102 digitally representing the voltage to be applied to screen anode 128 is coupled by control logic 178 to digital/analog converter 180. From this two-bit word, digital/analog converter 180 produces an output voltage in proportion to the voltage to be applied to screen electrode 128. For example, for the 00 logic state digital/analog converter 180 produces a voltage $kV_1$, for the 01 state the voltage $kV_2$ is produced, for the 10 digital state the voltage $kV_3$ is produced, and for the 11 state the voltage $kV_4$ is produced, $k$ being the constant of proportionality between $V_A$, the voltage applied to screen electrode 128, and the output voltage of high voltage sensor 186. The output voltage from digital/analog converter 180 is coupled to the positive input terminal of differential amplifier 182.

High voltage sensor circuit 186 scales $V_A$ by the same scale factor $k$. The output of high voltage sensor 186 is coupled to the negative terminal of differential amplifier 182. When the output voltage of digital/analog converter 180 is higher than the scaled screen electrode voltage a positive voltage output is produced by differential amplifier 182 and when the output voltage from digital/analog converter 180 is less than the scaled voltage applied to screen electrode 128, a negative output voltage is produced. Tracking high voltage supply 184 increases its output voltage in response to a positive input voltage and decreases its output voltage for a negative input voltage. The output voltage is left unchanged for substantially zero input voltage. By this action the output of tracking high voltage supply 184 is made to follow the voltage applied to screen electrode 128 and to hold it constant during times when no voltage transitions are being performed.

In the preferred embodiment of the invention, tracking high voltage power supply 184 is connected in series with first static supply 152 by connecting the negative terminal of tracking high voltage supply 184 to the positive terminal of first static supply 152. Using this arrangement tracking high voltage supply 184 needs to produce voltages only in the range of 0 to $V_4 - V_1$. Of course, the negative terminal of tracking high voltage supply 184 could be grounded in which case the voltage range of tracking high voltage supply 184 would be $V_1$ to $V_4$.

The display system shown in FIG. 1 is the random access type of display system in which individual positions upon the face of beam penetration cathode-ray tube 120 are addressable as X-Y intersects in a two-dimensional matrix. The beam of cathode-ray tube 120 is positioned to a particular point by addressing the point digitally with X and Y sets of digital outputs of display processor 102. Characters and patterns are written by sequentially moving the beam from point to point as addressed by display processor 102. Under the control of display processor 102, video amplifier 113 blanks and unblanks the beam of cathode-ray tube 120 as necessary. Of course, the invention may be used as well with television-type raster scan display systems.

The X and Y digital outputs of display processor 102 are converted to analog voltages by X and Y digital/analog converters 104 and 106. X and Y deflection amplifiers 112 and 116 amplify the analog voltages representing the points at which the beam is to be positioned. The outputs of X and Y deflection amplifiers 112 and 116 are coupled to X and Y magnetic deflection coils 117 and 118 which produce therefrom magnetic fields capable of deflecting the beam to the desired positions. The amount of magnetic field required to displace the beam of cathode-ray tube 120 by a given distance on the face thereof is dependent upon the voltage applied to screen electrode 128. It has been found that for the tube described and shown in the aforementioned U.S. Pat. No. 3,840,773 that the change in required magnetic field to deflect the beam a predetermined distance varies substantially linearly with the change in voltage applied to screen electrode 128. Accordingly, X and Y deflection gain compensators 108 and 110 compensate the voltages produced by X and Y digital/analog converters 104 and 106 respectively such that a given voltage output from digital/analog converters 104 and 106 represents the same deflection distance of the beam upon the face of cathode-ray tube 120 independent of the magnitude of voltage applied to screen electrode 128.

When changing from one color to another the beam of cathode-ray tube 120 should ordinarily be blanked. Otherwise, an observer would see changes in color as a character or pattern being written. However, it is an advantage of the invention that with the constant deflection factor of the invention the beam may be unblanked and character or pattern generation commenced before the voltage applied to screen electrode 128 reaches its final value. No distortions in position or pattern will be observed. The human eye is fairly insensitive to small changes in color and it is quite possible that in many situations small differences in color may be tolerated for short distances in return for a decrease in the waiting time between switching between colors.

Figure 2:
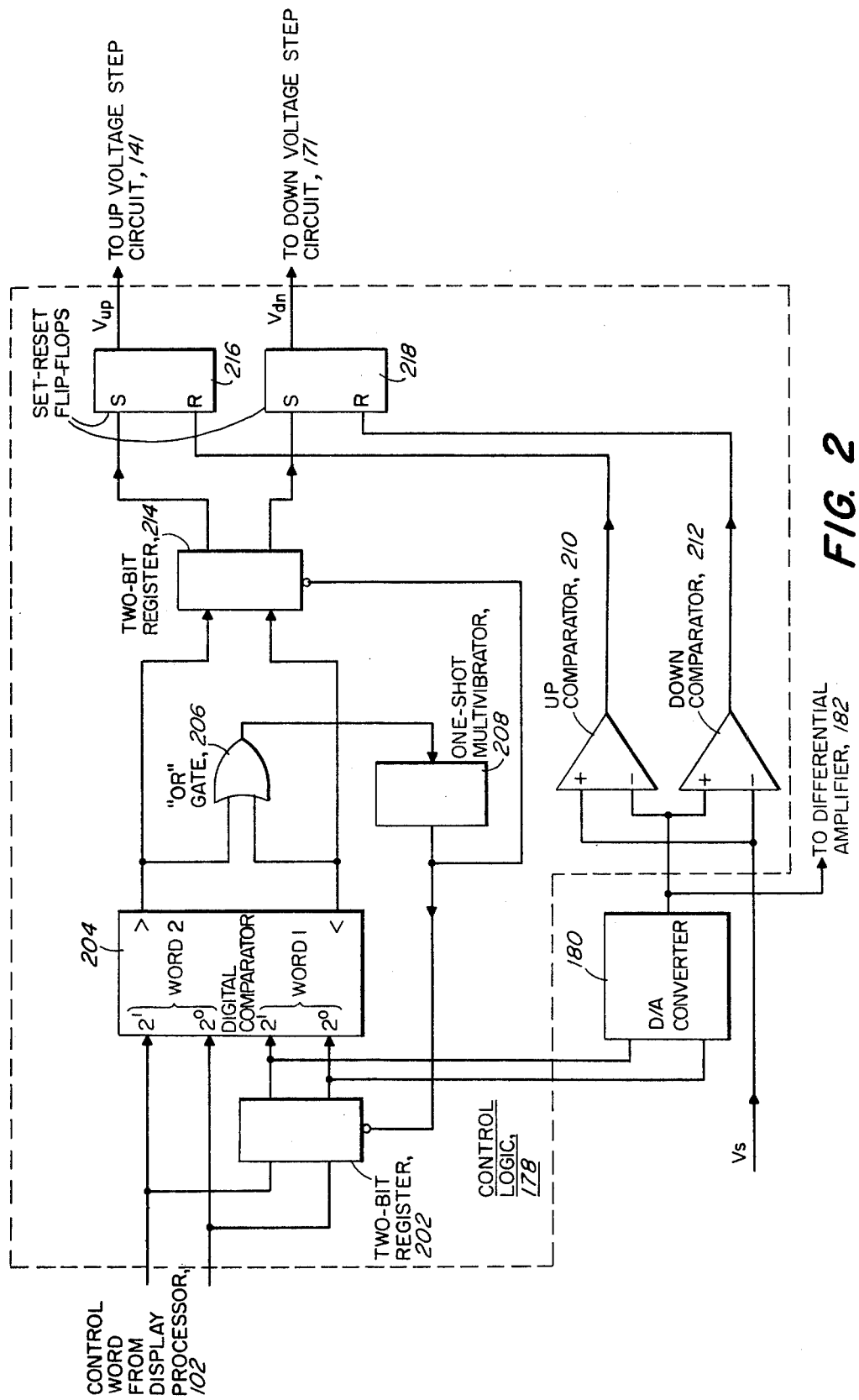
FIG. 2 is a schematic diagram of the control logic shown in the block diagram of FIG. 1.

Referring now to FIG. 2 there is shown therein a schematic diagram of control logic 178 of FIG. 1. The control word from display processor 102 is coupled to two components, digital comparator 204 and two-bit register 202. Two-bit register 202 initially holds the previous two-bit word corresponding to the present color being displayed. Digital comparator 204 makes a continuous comparison between the digital word as coupled directly from display processor 102 and the previous word as stored by two-bit register 202. If the word from display processor 102 is greater than the previous word, a logical 1 output is produced upon the ">" output. If the word from display processor 102 is less than the word upon the output of two-bit register 202, the "<" output becomes a logical 1. If the words are of equal value both outputs of digital comparator 204 remain in the logical 0 state. A 1 on either output of digital comparator 204 produces a 1 on the output of OR gate 206. The presence of a logical 1 on the output of OR gate 206 causes one-shot multivibrator 208 to produce a single pulse which clocks two-bit register 202 and two-bit register 214 causing them to store the words then on their input lines. This pulse also causes the output of digital comparator 204 to be locked into the outputs of two-bit register 214. The output of two-bit register 202 then becomes the same as the control word then being coupled from display processor 102. As both sets of inputs to digital comparator 204 are then identical, both outputs return to the 0 state. However, one of the outputs of two-bit register 214 will remain in the 1 state until the control word from display processor 102 again changes.

As one of the outputs of two-bit register 214 goes from the 0 to 1 state, the corresponding one of set-reset flip-flops 216 and 218 assumes the same state. This results in activation of one of $V_{up}$ or $V_{dn}$ which in turn activate one of up voltage step circuit 141 or down voltage step circuit 171.

The output of two-bit register 202 containing the new control word is also coupled to digital/analog converter 180. As explained above, digital/analog converter 180 produces as an output a voltage in proportion to the high voltage applied to screen electrode 128. This voltage is coupled to the negative input of up comparator 210 and the positive input of down comparator 212. For both comparators if the positive input is at a lesser voltage than the negative input, the output remains in the 0 state. If the positive input is at a higher voltage than the negative input, the output will be in the logical 1 state. If both inputs are equal or substantially equal, the outputs will remain in the 1 state. Hence, if set-reset flip-flop 216 was set in the logical 1 state for an upward transition of voltage, the voltage applied to screen electrode 128 will continue increasing until the voltage $V_s$ becomes equal to the output voltage from digital/analog converter 180. At that time, up comparator 210 produces a logical 1 on its output which in turn resets set-reset flip-flop 216 to the 0 state. Similarly, for a downward transition in voltage, down comparator 212 will produce a logical 1 on its output when the voltage $V_s$ has decreased to the output voltage from digital/analog converter 180. At that time, set-reset flip-flop 218 which produces $V_{dn}$ will return to the 0 state.

Figure 3:
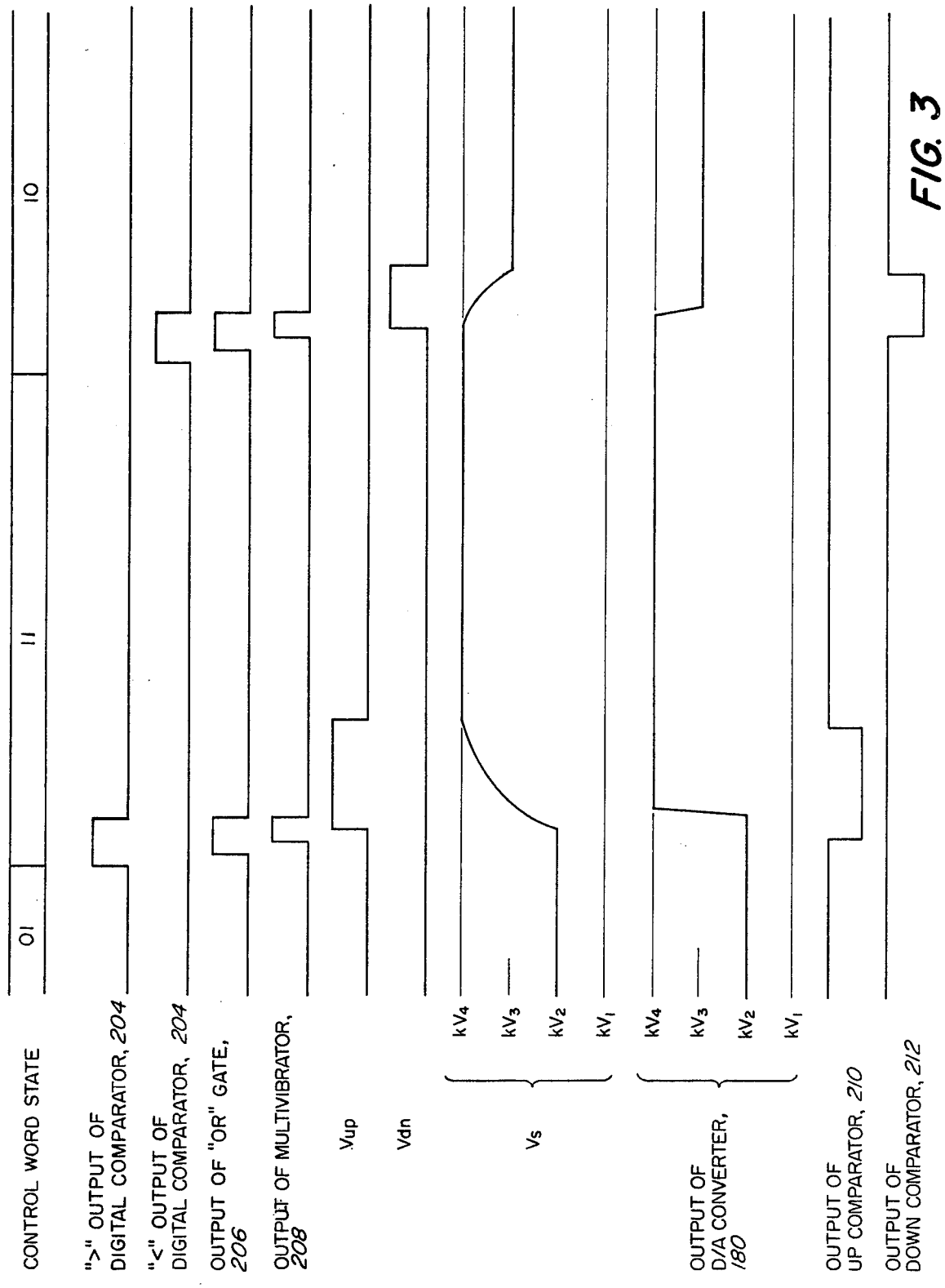
FIG. 3 shows a series of waveforms useful in understanding the operation of the system of FIG. 1 and the circuitry of FIG. 2.

In FIG. 3 are shown two examples of transitions between voltage states. Initially, it is assumed that the control word is in the 01 state corresponding to voltage $V_2$ applied to screen electrode 128. As the control word changes from 01 to 11 corresponding to an upward change in voltage from $V_2$ to $V_4$ the ">" output of digital comparator 204 assumes the 1 state. The output of OR gate 206 then also assumes the 1 state. Multivibrator 208 next produces a pulse of predetermined width on its output. The falling edge of this pulse clocks the new control word into two-bit register 202 which causes the ">" output of digital comparator 204 and the output of OR gate 206 to return to the 0 state. The pulse from the output of multivibrator 208 also clocks the 1 output from the ">" output of digital comparator 204 into two-bit register 214 which sets to the 1 state the output of set-reset flip/flop 216 causing $V_{up}$ to be set in the 1 state. As soon as the new value of the control word has been clocked into two-bit register 202 the output of digital/analog converter 180 changes from $kV_2$ to $kV_4$. So long as $V_{up}$ remains in the 1 state the voltage applied to screen electrode 128 will rise. $V_s$ rises in proportion to the voltage applied to screen electrode 128. The output of comparator 210 which changed to the 0 state as soon as $V_s$ changed remains in the 0 state until $V_s$ reaches $kV_4$. At that time, the output of up comparator 210 returns to the 1 state resetting set-reset flip-flop 216 thereby causing $V_{up}$ to return to 0. When $V_{up}$ is in the 0 state the voltage applied to screen electrode 128 can no longer rise and hence $V_s$ remains at a constant value of $kV_4$.

A similar operation takes place later when the two-bit control word from display processor 102 changes from the 11 to the 10 state corresponding to a downward transition in voltage from $V_4$ to $V_3$. As soon as the change in state of the control word is made, the "<" output of digital comparator 204 assumes the 1 state as does the output of OR gate 206. The 1 on the output of OR gate 206 causes the generation of a pulse upon the output of multivibrator 208 as in the previous example. A 1 is clocked into two-bit register 214 which sets to the 1 state the output of set-reset flip-flop 218 causing $V_{dn}$ to change from the 0 to 1 state. The voltage applied to screen electrode 128 begins to decrease and continues to decrease until the voltage $V_3$ is reached. The output of digital/analog converter 180 drops from $kV_4$ to $kV_3$ as soon as the new value of the control word was clocked into two-bit register 202. The output of down comparator 212, which assumed the 0 state as soon as $V_s$ began to change, remains in the logical 0 state until $V_s$ has fallen to $kV_3$. At that time, set-reset flip-flop 218 is reset and $V_{dn}$ returns to the 0 state thereby halting any further decrease in the voltage applied to screen electrode 128.

Figure 4:
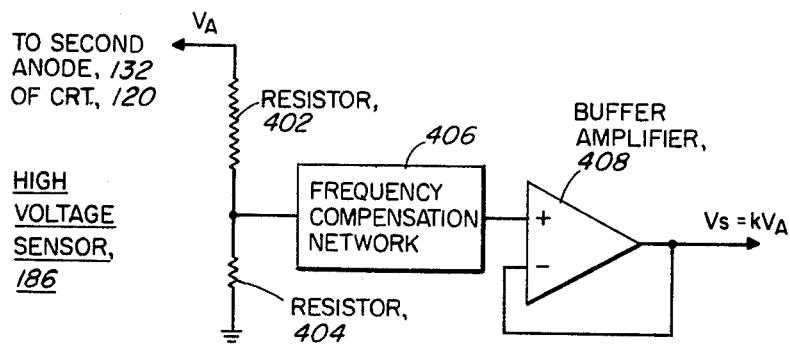
FIG. 4 is a schematic diagram of the high voltage sensor circuit shown in the block diagram of FIG. 1.

Referring now to FIG. 4 there is shown therein the schematic diagram of the high voltage sensor circuit 186 as shown in FIG. 1. This circuit basically comprises a voltage divider formed from resistors 402 and 404, frequency compensation network 406, and unity gain buffer amplifier 408. The upper end of high resistance resistor 402 is connected to the lead from contact of second anode 152 coupled to the screen electrode 128. The value of resistors 402 and 404 are chosen such that $(R404/R402+R404) = k$, where R404=resistance of resistor 404 and R402=resistance of resistor 402. Frequency compensation network 406 is preferably a passive network of components which compensates in the frequency domain for distortion in the voltage produced at the junction between resistors 402 and 404 caused by parasitic capacitance and inductance of the resistors. This insures that the waveform of $V_s$ is a true replica of the waveform of $V_A$. The output of frequency compensation network 406 is coupled to unity gain buffer amplifier 408 which provides a sufficiently low impedance output to drive the circuitry to which its output is coupled.

Figure 5:
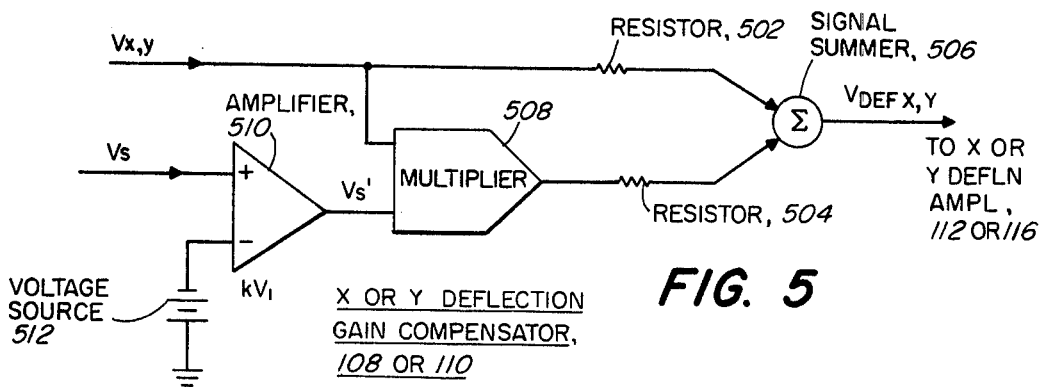
FIG. 5 is a schematic diagram of a gain compensator circuit as shown in the block diagram of FIG. 1.
Figure 6:
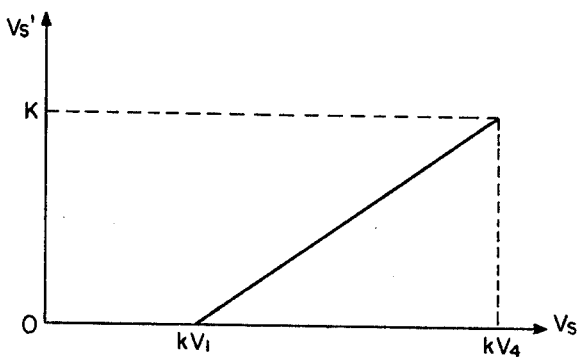
FIG. 6 is a graph useful in explaining the operation of the circuitry shown in FIG. 5.

In FIG. 5 is shown the schematic diagram of X and Y deflection gain compensators 108 or 110. The output voltage from one of X and Y digital/analog converters 104 and 106 $V_X$ or $V_Y$ is coupled to one input of multiplier 508. $V_s$, the voltage output of voltage source 512, is connected to the positive input of differential scaling amplifier 510 while a constant negative potential of $kV_1$ is provided upon the negative input terminal of the amplifier. The output of amplifier 510 with respect to $V_s$ is plotted in FIG. 6. As $V_s$ increases, the voltage applied to screen electrode 128 also increases and the deflection factor of cathode-ray tube 120 decreases making it necessary to use larger magnetic fields to achieve the same amount of deflection as for lower voltages. When $V_s = kV_1$ the output of amplifier 510 produces a voltage corresponding to a scaling factor of 0. As $V_s$ increases to $kV_4$ and as the voltage applied to the screen electrode 128 increases to $V_4$ the output of amplifier 510 increases to a value K. K is equal to the increase in gain required to produce the same deflection for screen electrode 128 voltage $V_4$ as was produced for $V_1$. The output of multiplier 508 is coupled through summing resistor 504 to signal summer 506 to be summed with $V_X$ or $V_Y$ coupled through summing resistor 502. The sum of the two signals produces the output voltage for driving X and Y deflection amplifiers 112 and 116.

Figure 7:
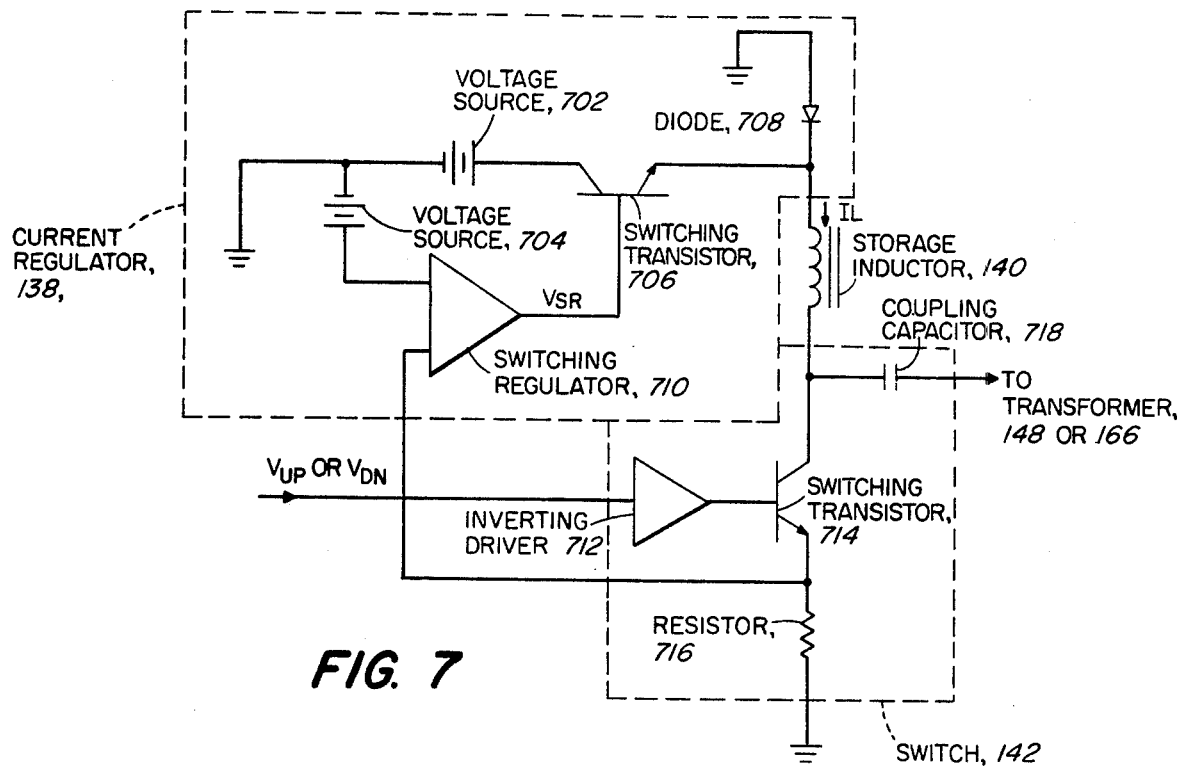
FIG. 7 is a schematic diagram of one of the voltage step circuits shown in the block diagram of FIG. 1.

Referring now to FIG. 7 there is shown a schematic diagram of one of down voltage step circuit 171 or up voltage step circuit 141 as shown in block diagram form in FIG. 1. During steady-state conditions when no voltage transitions are being made, switching transistor 714 is turned on thereby permitting current to flow through storage inductor 140, switching transistor 714 and low resistance sensing resistor 716. Drive current to the base of switching transistor 714 is supplied by inverting driver 712 the input of which is coupled to one of $V_{up}$ or $V_{dn}$. Inverting driver 712 may be a common emitter operated single transistor stage or a logic inverter capable of producing the proper output voltage for driving switching transistor 714. Input current to storage inductor 140 is supplied by current regulator 138. Switching regulator 710 makes a comparison between the voltage of voltage source 704 and the voltage across sensing resistor 716. When the voltage across sensing resistor 716 falls below the voltage of voltage source 704, switching regulator 710 produces an output voltage pulse of predetermined width which turns on switching transistor 706 during the duration of the pulse. Switching transistor 706 couples voltage source 702 to the input terminal of storage inductor 140 during this time. After the voltage of the pulse from switching regulator 710 has returned to 0, current continues to flow through diode 708 to storage inductor 140. When the current through storage inductor 140 has decayed to a predetermined level as sensed by the voltage across sensing resistor 716, switching regulator 710 turns back on again coupling voltage source 702 to the input terminal of storage inductor 140 thereby maintaining idling current flow through storage inductor 140 between predetermined current and hence energy levels.

When a transition in the high voltage applied to screen electrode 128 is to be made switching transistor 714 is turned off by one of $V_{up}$ or $V_{dn}$. Current flow through storage inductor 140 then switches from through switching transistor 714 to through coupling capacitor 718 to primary winding 168 of transformer 166 or primary winding 146 of transformer 148. The value of coupling capacitor 718 is much larger than the capacitance with respect to ground of screen electrode 128 or of the stray inductance within transformers 166 and 148 serving only to block the flow of DC bias current.

Figure 8:
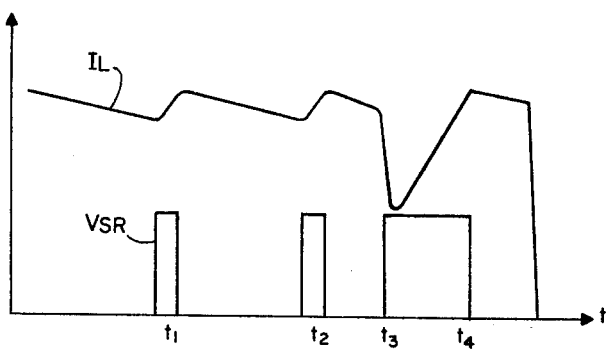
FIG. 8 shows waveforms useful in explaining the operation of the circuitry shown in FIG. 7.

In FIG. 8 there is shown a graph of the current waveform through storage inductor 140 and the voltage waveform of the output of switching regulator 710. Switching regulator 710 turns on at times $t_1$ and $t_2$ maintaining the current $I_L$ within predetermined limits. At time $t_3$ switching transistor 714 turns off and the current $I_L$ flows through primary winding 168 of transformer 166 or primary winding 146 of transformer 148 at least partially discharging inductor 140 in a short period of time. As soon as the voltage applied to the screen electrode 128 has reached the desired value, switching transistor 714 is turned back on and the appropriate idling current is again maintained through storage inductor 140.

This concludes the description of the preferred embodiment of the invention. Although preferred embodiments of the invention have been described, it is believed that numerous modifications and alterations thereto would be apparent to one skilled in the art without departing from the spirit and scope of the invention.

What is claimed is:

1. In combination:
   a beam penetration cathode-ray tube having an accelerating and a screen electrode;
   at least one inductor;
   means for maintaining a DC idling current through said inductor while a constant voltage is applied to said screen electrode; and
   means for selectively coupling said inductor to said screen electrode in response to a signal for determining which of three or more colors of light is to be emitted from said cathode-ray tube, said coupling means comprising switching means operating to couple said inductor to said screen electrode upon a change in said signal and operating to uncouple said inductor from said screen electrode when the voltage applied to said screen electrode is at a value causing the color of light indicated by said signal to be emitted from said cathode-ray tube, the major portion of the energy required to vary said voltage applied to said screen electrode being from said inductor.

2. The combination of claim 1 further comprising means for maintaining the voltage applied to said screen electrode at said value causing the color indicated by said signal to be emitted from said cathode-ray tube after changes in said voltage have occurred.

3. The combination of claim 2 wherein said coupling means further comprises transformer means.

4. The combination of claim 3 wherein said inductor, said idling current maintaining means, and said coupling means are each two in number, one of said inductor, idling current maintaining means, and coupling means being provided for upwards transitions of said voltage applied to said screen electrode and one of said inductors, idling current maintaining means, and coupling means being provided for downwards transitions of said voltage applied to said screen electrode.

5. The combination of claim 4 further comprising in combination:
   means for deflecting the beam of said cathode-ray tube; and
   means coupled to said deflecting means and operating in response to said voltage applied to said screen electrode for compensating the amplitude of signals produced by said deflecting means, the size of patterns displayed on said cathode-ray tube being substantially independent of the color in which said patterns are displayed.

6. A power supply comprising in combination:
   at least one inductor;
   means for maintaining a DC idling curren through said at least one inductor while a constant voltage is applied to load means; and
   switch means for coupling said at least one inductor to said load means for changing the voltage at said load means to a selected one of three or more predetermined values and for uncoupling said at least one inductor from said load means when said selected value has been attained, the major portion of the energy used in changing said voltage at said load means being from said inductor.

7. The combination of claim 6 further comprising means coupled to said load means for sensing the voltage at said load means, said switch means uncoupling said inductive means from said load means in response to the sensed voltage.

8. The combination of claim 7 further comprising transformer means for coupling the output of said switch means to said load means.

9. The combination of claim 8 further comprising voltage supply means coupled to said transformer means.

10. The combination of claim 9 further comprising means for maintaining said predetermined voltage at said load means once said predetermined voltage has been attained.

11. In combination:
   an up voltage step circuit and a down voltage step circuit, each of said circuits comprising:
   an inductor;
   means for maintaining a DC idling current through said inductor while a constant voltage is applied to load means;
   switching means coupled to said inductor;
   first and second DC power supply means, said first and second DC power supply means being coupled to series with one another;
   first and second transformer means, said first transformer means being coupled to an output of said up voltage step circuit and said second transformer means being coupled to an output of said down voltage step circuit, each of said transformer means being coupled to said load means;
   means for operating said switch means in said up voltage step circuit to couple said inductor therein to said first transformer means in response to a signal indicating an upward transition in voltage and means for operating said switch means in said down voltage step circuit to couple said inductor therein to said second transformer means in response to a signal indicating a downward transition in voltage; and
   means for operating both of said switch means to uncouple said inductor from said transformer means when a predetermined voltage value among three or more selectable values has been reached in response to said voltage across said load means.

12. The combination of claim 11 further comprising means for maintaining said predetermined voltage across said load when said predetermined voltage has been reached.

13. The combination of claim 11 further comprising means for producing said signal indicating an upward transition in voltage and said signal indicating a downward transition in voltage.

14. The combination of claim 13 wherein said signal producing means comprises:
   means for receiving a digital word, said digital word being indicative of the voltage to be produced across said load;
   means for comparing said digital word with a previously received digital word;
   means for producing one of said signals when said digital word is larger than said previously received digital word and the other one of said signals when said digital word is smaller than said previously received digital word;
   means for producing an analog voltage in response to said digital word;
   means for comparing said analog voltage with a voltage proportional to said voltage across said load; and
   means for ceasing production of said signals in response to said comparing means.

15. The combination of claim 14 further comprising said load, said load comprising an anode of a beam penetration cathode-ray tube.

16. The combination of claim 15 wherein said beam penetration cathode-ray tube comprises a split-anode cathode-ray tube and said anode comprises the screen anode of said cathode-ray tube.

17. The combination of claim 16 further comprising means for deflecting the beam of said cathode-ray tube.

18. The combination of claim 17 wherein said beam deflecting means comprises:
   X-axis and Y-axis deflection amplifiers; and
   X-axis and Y-axis deflection coils.

19. The combination of claim 18 further comprising means for varying the magnitude of output signals from said deflection amplifiers in response to the voltage applied to said screen anode.

20. The combination of claim 19 wherein said magnitude varying means comprises:
   means for producing a scaling signal in proportion to said voltage applied to said screen electrode added to a constant voltage;
   means for multiplying output signals produced by said deflection amplifiers by said scaling signal to produce a compensating signal; and
   means for summing said output signals produced by said deflector amplifiers with said compensating signal.

21. The combination of claim 16 wherein said cathode-ray tube further comprises an accelerating electrode and further comprising a source of substantially constant voltage coupled to said accelerating electrode.

22. The combination of claim 16 further comprising:
   means for producing digital signals, said digital signals being indicative of beam deflections of said cathode-ray tube; and
   means for converting said digital signals to analog signals.

23. The method comprising the steps of:
   storing energy in one or more inductors by passing a DC idling current therethrough while a constant voltage is applied to a load;
   coupling energy from said one or more inductors to said load in response to a signal for changing the voltage across said load, said signal being determinative of three or more selectable voltages; and
   ceasing said coupling of energy from said one or more inductors to said load when the voltage across said load has reached a predetermined value.

24. The method of claim 23 wherein said load comprises an anode of a beam penetration cathode-ray tube and said changing of voltage changes the color of light emitted from said cathode-ray tube.

25. The method of claim 24 further comprising the step of maintaining said voltage at said predetermined value when said predetermined value has been reached.

26. The method of claim 25 further comprising the step of deflecting the beam of said cathode-ray tube with beam deflecting means in response to signals representing patterns to be displayed on the screen of said cathode-ray tube.

27. The method of claim 26 further comprising the step of varying the magnitude of output signals from said beam deflecting means in response to the voltage applied to said anode.

* * * * *